United States Patent [19]

Hedström et al.

[11] 4,290,269
[45] Sep. 22, 1981

[54] PROCESS FOR THE EFFICIENT CONVERSION OF WATER-CONTAINING ORGANIC MATERIALS AS FUELS INTO ENERGY

[75] Inventors: Bengt O. A. Hedström, Gothenburg; Claes G. S. Svensson, Kungälv, both of Sweden

[73] Assignee: MoDo-Chemetics AB, Ornskoldsvik, Sweden

[21] Appl. No.: 83,194

[22] Filed: Oct. 9, 1979

[51] Int. Cl.³ ............................................. F01K 21/00
[52] U.S. Cl. .................................... 60/670; 34/12; 34/72; 34/86; 110/221; 110/229
[58] Field of Search .................. 60/643, 645, 670; 34/72, 12, 86; 110/221, 229

[56] References Cited

U.S. PATENT DOCUMENTS

| | | | |
|---|---|---|---|
| 3,131,035 | 4/1964 | Erickson | 34/86 X |
| 3,181,488 | 5/1965 | Roe et al. | 110/101 R |
| 3,309,780 | 3/1967 | Goins | 34/86 X |
| 3,798,785 | 3/1974 | Chamouton | 34/86 X |

*Primary Examiner*—Allen M. Ostrager

[57] ABSTRACT

A process is provided for the efficient conversion of water-containing organic materials such as bark, peat and sludge as fuels into energy, including drying the materials to convert them into fuels and then combusting the fuels in order to recover as much energy as possible at the lowest possible cost; which comprises heating the material in a steam vessel while enveloping the material in steam at superatmospheric pressure, heating the steam by heat exchange with steam at a higher pressure and higher temperature than the steam in the vessel; mechanically dewatering the material; and then drying the material to convert the material into a fuel, converting water driven from the material into steam, and forming excess steam in the dryer, of which steam all or part is recycled and condensed directly on the material in the steam vessel; and then combusting the dry material in finely divided form in a steam boiler, utilizing the high pressure steam that is generated in a turbine, which in turn operates a generator, converting the energy content of the steam into electric energy; and utilizing part of the turbine steam for heat exchange with the dryer system.

13 Claims, 5 Drawing Figures

PROCESS FOR THE EFFICIENT CONVERSION OF WATER-CONTAINING ORGANIC MATERIALS AS FUELS INTO ENERGY

STATE OF THE ART

Within large industrial plants, for instance, cellulose pulp and paper mills, and large municipal sewage plants, disposal of the waste sludge can be a serious problem. Landfill, pond and dump sites pose a threat to the environment. Sludge recovery processes, for instance, bacterial decomposition and chemical treatment such as liming, are costly, and the costs cannot always be recovered, since the market for the products is small. Systems for dewatering and drying sludge therefore have been developed in order to convert the sludge into a fuel and then burn it.

Swedish Pat. No. 71 13295-5 describes a process for dewatering sludge filter cakes. According to this process, steam is blown onto the filter cake, reducing the viscosity, and applying a vacuum to remove the water. However, the economics of this process are poor. Characteristic of the sludge handling systems which have been developed is a high operating cost, in spite of the recovery of the high combustion heat of the sludge as fuel. Furthermore, the efficiency and reliability of these systems is unsatisfactory.

Bark is today a great extent used as a fuel primarily for environmental reasons, since the dumping of bark is forbidden in many places. The efficiency of bark combustion plants is usually low, and especially in the winter one has to add and burn oil, in order to keep the bark burning in the boiler. If the solids content of the bark is below 30%, which is often the case, the bark will not burn without added fuel, such as gas or oil. In many cases, the bark is dewatered mechanically; however, dewatering usually does not yield a higher than about 40% solids content. The bark can be dried, using flue gases from a special boiler, in which part of the bark is burned, or using flue gases from the steam boiler, in which all the bark is burned. However, in a plant of the first type, about one-third of the bark has to be burned in order to dry the remaining two-thirds of the bark. The dried bark has a solids content of about 45%, as compared to a solids content of about 30% before the drying. This means that one loses about 15% of the heat value of the bark which could have been utilized in the steam boiler, if it had been possible to burn the bark with a solids content of 30% without operating problems. A plant of the second type is economical only at an increase of the solids content of at most 10%, and is used mainly to obtain more uniform operating conditions. If one seeks to increase the solids content by more than 10% by means of flue gases, the total efficiency decreases too much.

Burning of bark usually is carried out on grates-, so-called sloping grates, or in cyclone furnaces. Both types of devices are relatively expensive, and also labor-intensive, when compared, for instance, with suspension firing. As is known, the wetter the bark, the lower the efficiency and the larger and more expensive the boiler. The effective heat value of the bark varies with the wood species. For spruce bark, the effective heat value is about 19 MJ/kg of dry bark. Spruce bark of 40% solids content has an effective heat value of about 14.5 MJ/kg of dry bark. Taking into consideration the decrease in efficiency of the boiler as the solids content increases of the material which is to be burned, one finds that the total degree of efficiency in today's bark combustion—that is with a bark solids content of about 40%—is only insignificantly more than 50%.

Peat is today used only to a small extent as a fuel. The technique that has been available is inadequate to meet present-day requirements for continuous operation, high operating reliability and efficiency. Peat milled by cutting during the summer months has at best a solids content of between 40 and 50%. During rainy periods, the peat is wetter and its heat value rapidly decreases as the solids content decreases.

In order to obtain a uniform production of peat over the entire year, different ways of treating the peat have been developed. What has been most interesting is the so-called wet-coaling, which makes it possible to mechanically dewater peat to an about 50% solids content. Peat as existing in the peat moss has a varying solids content and composition. Normally, raw peat has a solids content of between 10 and 20%, and cannot easily be dewatered mechanically to more than 35% solids content, if it is not treated in some way.

In wet coaling, the peat is heat-treated at a concentration of 5 to 10%, by pumping the suspension through a heat-exchanger in which it is heated into a set coaling reactor, in which direct heating with steam is carried out for a longer time. The treatment is usually carried out batchwise over a time of one to two hours at from 150° to 200° C.

British Pat. No. 183,180 and Swedish Pat. Nos. 40,679 and 46,995 describe methods and devices for heating the peat suspension with steam. During the heat treatment, between one and two tons of steam per ton of solids is used, and the steam is condensed in the peat suspension or on a heating surface, depending on which type of equipment is used. During the long wet-coaling period, the amount of solids is reduced by at least 5 to 10% by oxidation of the organic material to carbon dioxide and water. After the wet-coaling, the suspension is heat-exchanged with the new peat suspension to be treated, and which is thereby preheated. This preheating can be carried out in an apparatus which is described in Swedish Pat. No. 46,386.

After wet-coaling, the peat is dewatered mechanically with presses to an at best 50% solids content. A greater part of the press-water so obtained is reused for dilution of the peat suspension; the rest of the press-water has to be dumped. The moist press-cakes of half-dry peat so obtained are used as fuel, although the thermal value of the peat is low, because of the low solids content.

A further increase in the solids of the peat is possible only by drying. There is no drying method which is economically advantageous today. While peat briquettes with a solids content of about 90% are manufactured, such briquettes cannot be used industrially as a fuel because of the high price, although they can be used in households.

The drying methods that are used often make use of flue gases from the combustion of the fuel as a drying medium. However, the process is not economic when one tries to increase the solids content of the peat by more than 10%. If the peat is dried in several stages, a somewhat better degree of efficiency is obtained.

In the so-called Bojner dryer, which is described in Swedish Pat. No. 9837, the material first is dried in air with moist air or steam as a heating medium, and then in flue gases from a combustion oven for the fuel.

U.S. Pat. No. 2,014,764 describes an apparatus in which steam is used as the drying medium. In this apparatus, however, the peat is first dried in air, with hot water as the heating medium, which water has been obtained by scrubbing the moist air coming from the steam-heated drying stage, where the peat is finally dried. This process is very complicated, and reduces the heat consumption during drying only by about 30%.

There are also other special drying methods for peat, such as for example, drying in molten metal, which is described in British Pat. No. 183,180.

The combustion of peat is carried out in different types of boilers. Burning of coarser particles such as peat press-cakes is carried out on some sort of grate. Usually, air from the combustion is blown through the furnace in order to dry the peat in the boiler before it is set on fire. Smaller and above all dry peat particles are burned in powdered form. The powder is blown often together with the gases of combustion into the boiler.

The burning of moist fuel requires greater excess air than dry fuel, which gives a greater amount of flue gases, and a lower combustion and flue gas temperature. This together with the fact that often a great part of the energy content is consumed to evaporate the water content of the moist fuel results in a lower degree of efficiency for the boiler. In order to recover a given amount of energy, more fuel and a greater and a thereby more expensive boiler are needed than if dry fuel could have been used.

For peat, the effective heat value is about 20 MJ/kg of dry peat. FIG. 1 shows in graph form how the heat value decreases as the solids content decreases. Assuming that about 3 MJ are required in a boiler to produce 1 kg of steam, one can theoretically obtain about 6.7 kgs of steam per kg of dry peat. If the peat has a solids content of 50%, the effective heat value as can be seen from FIG. 1 is about 8.5 MJ/kg. Taking into consideration a decreased degree of combustion efficiency, one can then produce 5.1 kgs of steam per kg of dry peat. If it is to be economically worth while to dry peat to a solids content of 50%, no more than 1.6 kgs of steam per kg of dry peat can be consumed, which is not possible with present drying methods. With the available pretreatment technique, that is, wet coaling, peat with a solids content of 50% can be obtained for a steam consumption of between 1 and 2 kgs/kg of dry peat. There thus remains a net production of between 3 and 4 kgs per kg of dry peat. Depending on how economical the drying is, the total degree of efficiency thus will be between 3.100/6.7=45% and 4.100/6.7=60%. This simple balance shows what energy recovery is obtainable using modern techniques, if peat is used as fuel.

DESCRIPTION OF THE INVENTION

The present invention solves the problem of improving the recovery of energy by increasing efficiency in the drying and combustion of solid fuels obtained from water-containing organic materials such as bark, peat and similar substances.

The process in accordance with the present invention frees the water-containing material from solid impurities such as stone and metal and then converts it into a fuel by mechanically dewatering it in one or more stages, then drying it, if desired, after disintegrating it into coarse-and/or finely divided form, and then combusting the dry fuel in a thermal electricity-generating power plant. Before the final mechanical dewatering, it is directly heated with steam from the drying plant. The drying medium is steam at superatmospheric pressure, and steam generated in the thermal electricity-generating power plant is used to operate one or more turbines, and also for heat exchange with steam in the drying plant.

ADVANTAGES

The process has several advantages. Most important, it is possible to recover more efficiently than before the energy which is present in water-containing organic materials such as, for instance, bark, peat and sludge. By converting the material into a fuel in stages, using energy for successively raising the temperature in each stage, and optimizing operation of each stage from an energy point of view, the losses can be minimized so that the total efficiency will be surprisingly high. Furthermore, the process of the invention makes it possible to treat the organic material in a simple and operationally reliable way, so that it is possible to build a drying and combustion plant which can be run continuously without disturbing interruptions. In addition, the materials can be recovered in an environmentally advantageous way. The advantages of the process of the invention are illustrated in the Examples, in which applications of the process are described in more detail, and illustrated with the help of the FIGS. 2 to 5.

The process of the invention is applicable to any type of water-containing flammable organic materials. Examples of such materials are bark, wood shives, pieces, splinters, shavings and other wood rejects from saw mills and cellulose pulp mills; peat; sludges from municipal as well as industrial plants; and household waste (selected garbage).

DETAILED DESCRIPTION OF THE INVENTION

Figure 1:
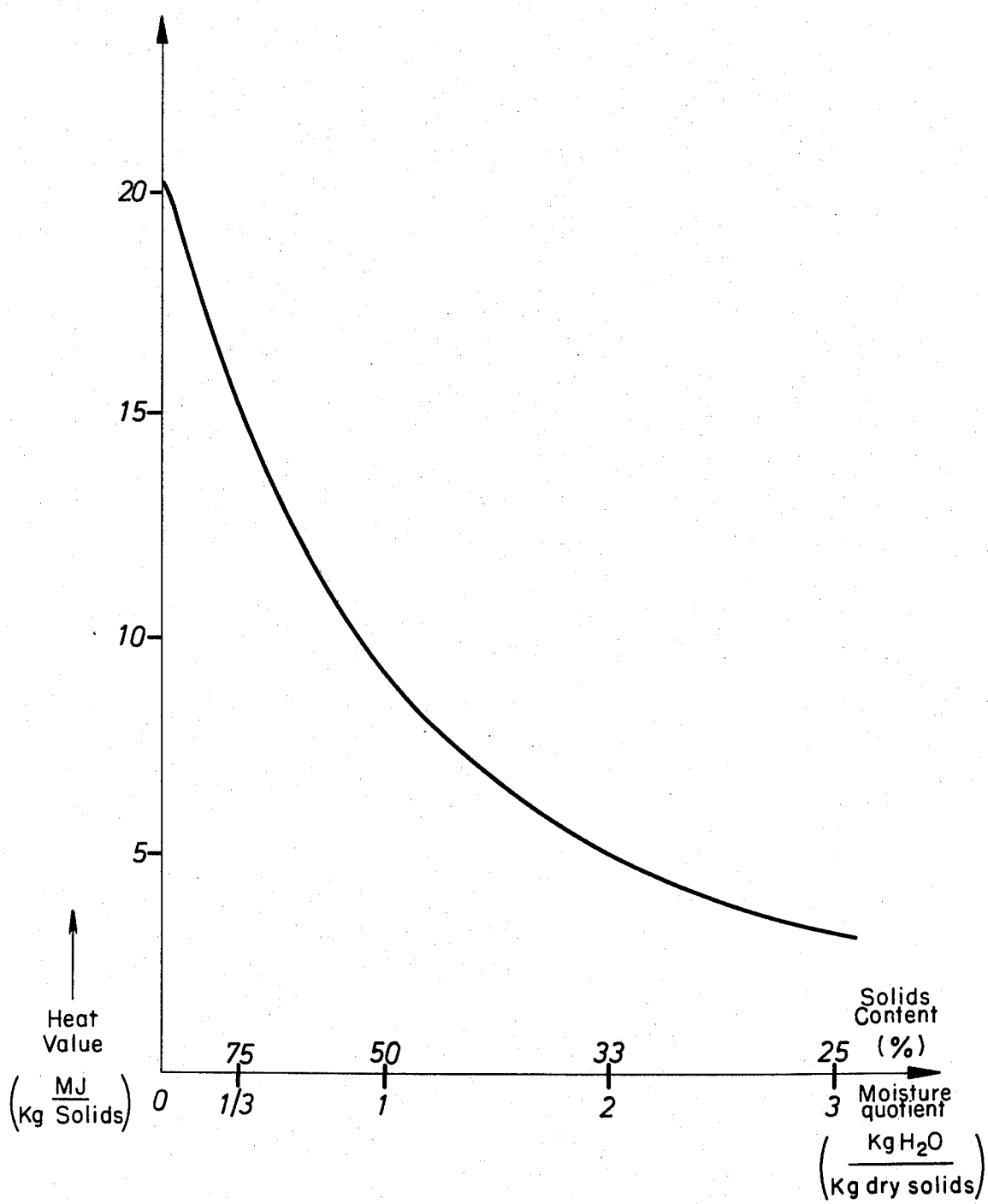
FIG. 1 shows how the effective heat value as ordinate varies with decreased solids content of the peat as abscissa.

If the organic material contains solid impurities, such as stones and metal pieces, these are removed by any known techniques before the material is treated in accordance with the invention. Furthermore, it is sometimes necessary to reduce the particle size of the material before treatment in accordance with the invention. When the organic material consists of bark, it is for instance as a rule necessary to disintegrate the coarsest and biggest bark pieces into small pieces.

The incoming organic material is dewatered mechanically in one or more stages. The number of dewatering stages is dependent upon the solids content of the organic material. If the solids content is relatively high, for instance, 20% and more, it can be increased satisfactorily in only one dewatering stage. This is for instance the case of peat that in part has been dewatered and dried during conversion from peat moss. In most cases, it is however, necessary to use two or more dewatering stages.

The dewatering process is carried out using known apparatus, such as, for instance, a hydraulic press, a screw press, a decanting centrifuge, a belt screen press, or a roller press.

Before the last mechanical dewatering stage, the organic material is heated with steam by directly condensing steam on the organic material. This direct condensation of steam is carried out either at atmospheric pressure or at superatmospheric pressure. The design of the apparatus used for this pretreatment stage is dependent upon whether atmospheric pressure or superatmospheric pressure is used.

The organic material at the start of this pretreatment stage should have a solids content of at least 10%. In this stage, the solids content of the organic material is temporarily decreased, since steam condenses in the material. The temperature of the organic material during this pretreatment stage usually lies within the range from about 40° to about 150° C., and the residence time varies from several minutes to one hour, depending upon the temperature and the material that is to be handled.

The steam used for direct condensation on the material is obtained as surplus steam from a steam dryer later in the process, that is, a dryer in which the transport medium and the drying medium are the same, namely, steam of a superatmospheric pressure. The steam dryer is described in more detail below.

Between the pretreatment stage using a direct condensation of steam on the material and the final drying stage, the material is subjected to a mechanical dewatering in which the previously mentioned dewatering apparatus is used.

Before the material is subjected to the drying treatment in the steam dryer, it is sometimes necessary to grind or disintegrate the same. Whether the material should be disintegrated or not in this stage of the treatment is determined partly by the sort of material that is to be handled, for instance, peat, bark or sludge, and partly by the sort of dewatering equipment that is used, and to a certain extent, also, the design of the steam dryer. The material can be ground or disintegrated in any suitable apparatus, such as for instance a hammer mill, pin mill, or a ball mill. Suitable devices for feeding the material into the drying and/or treatment equipment are rotary vane feeders, screw feeders, screw presses and the like.

The design of the steam dryer is not critical. In common with other steam dryers, the drying steam circulating system should be a closed recirculating system, so that a superatmospheric steam pressure is maintained. The superatmospheric steam pressure must be at least 1 MPa (10 bar).

When the organic material is bark or peat, the dryer is so constructed that heat is transferred from the steam to the material by means of convection.

When the organic material consists of sludge, the steam dryer is so constructed that the greatest part of the heat is transferred by means of conduction.

In the first case, the drying system contains a fan, which drives the steam and the material around the system, a heat exchanger and a cyclone. In the heat exchanger, the drying and the transport medium, that is, the carrier steam, is supplied with all heat necessary for the drying of the material by heat exchange in indirect contact of steam at higher pressure and higher temperature with carrier steam.

The heating steam is taken from a turbine. The turbine in its turn is fed with steam from a steam boiler, in which steam is produced by combustion of the dried material, and, if desired, additional fuel, for example, oil or gas. In the cyclone, the dried material is separated from the carrier steam, which continues its circulation, and in part is transferred to the pretreatment stage, as has been described earlier.

In the bottom of the cyclone there is a device, which discharges the dried material to atmospheric pressure. This device can consist of a rotary vane feeder or a screw feeder. The drying of the material is carried out during the transport of the material through the drying system. The water in the material thus is converted to steam in the course of transport. As a consequence of this, excess steam is formed in the steam dryer, which means that one can continuously withdraw a certain amount of steam from the drying system. The drying system may also include a fluidized bed, in which the material is kept for a certain time before the material, because of the decreased weight caused by the drying, is entrained in the steam and carried further, to the remaining part of the drying system. When drying sludge, a so-called contact dryer is used, in which the heat is transferred by means of conduction. Also in that case the indirect heating steam is obtained from a turbine.

After drying and discharge from the drying system, the material is transported, usually by means of a fan, to the furnace of a steam boiler for combustion. As transport or carrier media, air and/or flue gases are used. In the course of this transport, the material is further dried by means of so-called flash evaporation.

When the material is fed to the steam boiler for combustion, its solids content should exceed 90%. Furthermore, the particle size of the material during combustion should be less than 3 mm, preferably less than 1 mm.

If the particle size exceeds this, the material should be subjected to a grinding or a disintegration after the discharge from the drying equipment, and before the combustion. This can for instance be done in a so-called Kramer mill.

These two requirements, that is, a solids content exceeding 90%, and a particle size less than 3 mm, make it possible to carry out the combustion so completely that both the amount and the dust content in the flue gases will be low, which means a small and thereby inexpensive steam boiler. In addition, the steam boiler can be simple and reliable in operation.

The steam generated in the steam boiler by combustion of the dried material is, as is earlier described, led to a turbine or, if required, to several turbines. The pressure and the temperature of the steam upon arrival at the turbine or turbines are very high, for instance, 11.5 Mpa (115 bar), and 530° C.

A considerable amount of this energy is transformed to electricity by means of one or more generators. When the pressure of the steam has been decreased to about 1 to 2 MPa (10 to 20 bar), a part of the steam is discharged for use as an indirect heating medium for the drying and carrier steam, as has been earlier described.

The steam of lower pressure remaining in the turbine can be used for several useful purposes. For instance, the energy can be recovered in a distant heat exchanger in the preparation of hot water for local heating purposes. If the remaining steam is to be used as process steam, for instance, within a cellulose pulp mill, its pressure should preferably correspond to the pressure used in the drying equipment, that is, from 0.3 to 0.6 MPa (3 to 6 bar).

The invention is illustrated by the following Examples, which represent preferred embodiments of the invention:

EXAMPLE 1

Figure 2:
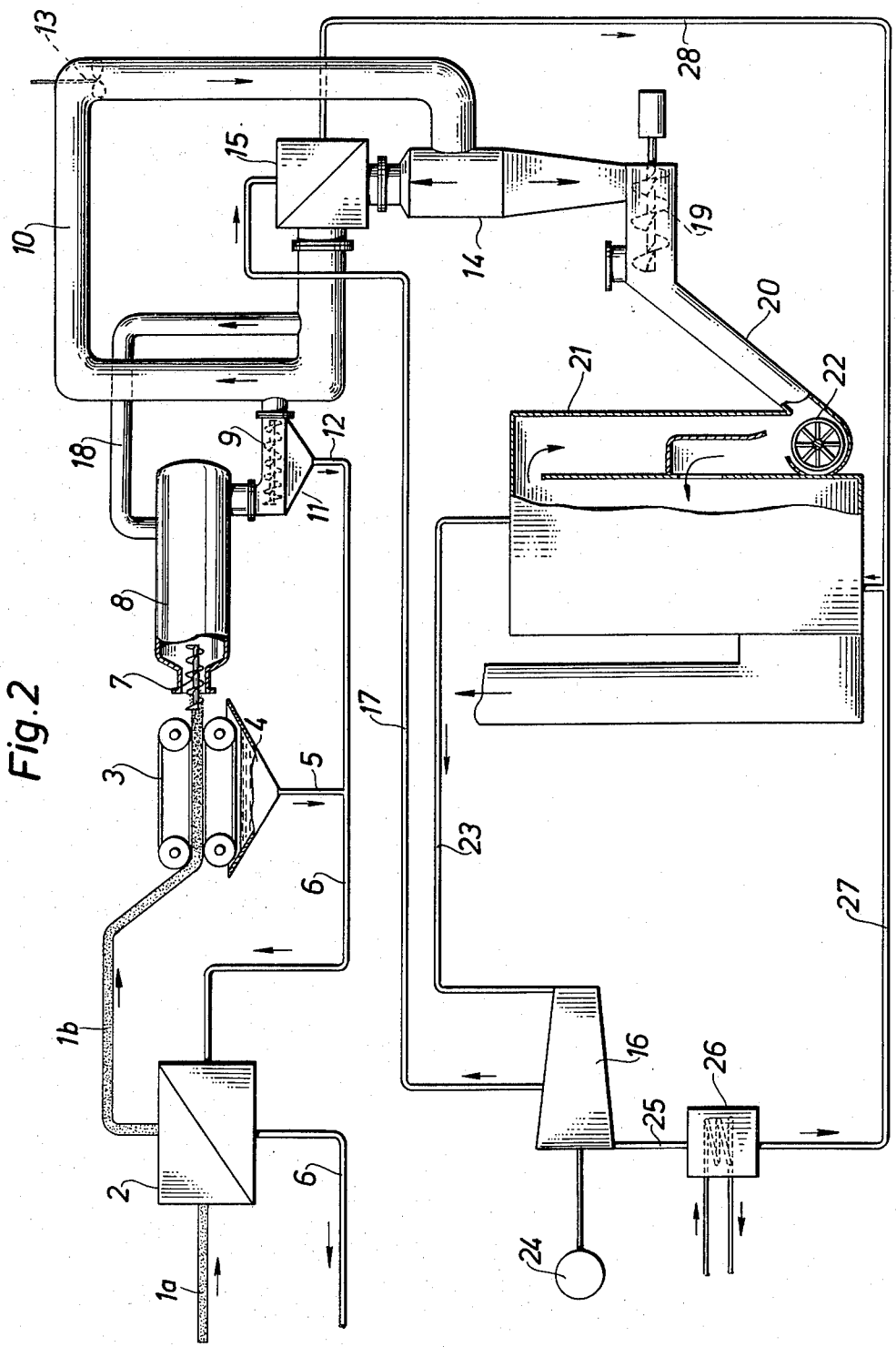
FIG. 2 shows a plant, in which the process of the invention is used in the drying of peat having a solids content of 10% and then combustion.

In the system shown in the flow sheet of FIG. 2, the process of the invention is applied to the drying of raw peat and following combustion of the peat.

The peat suspension is introduced via line 1a at a solids content of 10%, and is preheated in a heat exchanger 2 provided with scrapers that move against the heating surface and keep it clean, and that also establish good mixing of the peat suspension. The suspension is preheated to about 50° C. in the heat exchanger 2, with press water at a temperature of about 65° C. recycled from the dewatering stages 3 and 9. In the first dewatering stage, the peat suspension is carried via line 1b from the heat exchanger 2 to the dewatering press 3, where it is dewatered at a maximum pressure of about 2.0 MPa (20 bar), in the course of which the solids content of the peat suspension is increased to about 35%. The pressed-out water is collected by gravity below the press 3 in the hopper 4, and led via the conduit 5 to the common discharge conduit 6, which recycles it to the heat exchanger 2.

In the second dewatering stage, the dewatered peat is carried to a pressure vessel 8 by means of a feed screw 7. The vessel 8 is provided with carriers. In the vessel 8 the peat is treated with saturated steam via line 18, at a pressure of 0.5 MPa (5 bar), during a transit time of thirty minutes. The steam-treated peat then passes into a screw press 9, also functioning as feeding screw, where the peat is dewatered to a solids content of about 50%, and then fed into the cylindrical circulating dryer 10 of the type of U.S. Pat. Nos. 3,808,093 patented Apr. 30, 1974, and 4,043,049 patented Aug. 23, 1977 to Hedstrom. The water pressed out in the screw press 9 is collected from below in a hopper 11, and carried via the conduit 12 to the common discharge line 6.

In the dryer 10, superheated steam is circulated at a pressure of 0.5 MPa (5 bar), the same pressure as in the pressure vessel 8. The steam serves both as a drying medium and as a carrier for the peat particles. The peat particles pass the fan 13 where they are finely disintegrated and then transported in the fan-propelled stream through the dryer 10 to the cyclone 14. The steam, which is substantially saturated, is separated from the peat in the cyclone, and recirculated to the dryer 10 via a superheater 15, in which heat is indirectly transferred to the steam. Heat for the superheater 15 is taken from excess steam from the turbine 16 of the plant which is condensed at a pressure of 1.5 MPa (15 bar). The discharge steam is transported through the steam conduit 17 to the superheater 15. Excess steam from the drying of the peat is separated and led through the conduit 18 to the pressure vessel 8.

After steam drying, the peat has reached a solids content of 80%. The peat passes via the feed screw 19 to atmospheric pressure and is transported pneumatically through the conduit 20 to the boiler 21. During this travel the peat will dry further, partly because of the pressure drop, and partly due to transport in conduit 20. Before the peat is burned, it is ground in a special type of hammer mill with fixed hammers (Kramer mill) 22, together with circulating flue gases, and is then blown as a dust into the boiler 21. At the entrance to the furnace, the solids content of the peat is about 98%. In the boiler 21, working with a closed-feed water system, superheated steam is generated at a pressure of 11.5 MPa (115 bar) and a temperature of 530° C. The steam is led via the line 23 to one or more turbines 16 connected to a generator 24 for the production of electric power. From the turbine 16, a part of the steam is withdrawn and led via line 17 to superheater 15, for superheating the steam used as drying medium in the dryer 10. Residual steam is led from the turbine 16 at a temperature of 105° C. through the conduit 25 and condensed in the heat condenser 26. Other conventional discharges from the turbine to the boiler, between the superheaters etc., are not shown. Condensate feed water is carried back to the boiler 21 from the heat condenser 26 via the conduit 27, and from the superheater 15 via the line 28.

In Table I below, a comparison is made between the energy recovered according to the process of the invention and the energy recovered according to the previously known process for the preparation of peat press cakes using wet coaling. The figures relating to the previously know process have been obtained from a process in which peat having a solids content of 8% in countercurrent flow was prehated in a heat exchanger in which part of the heat was taken from already treated, that is wet coaled, peat. The rest of the energy required for the preheating was added in the form of fresh steam from the boiler. After the preheating, the peat was fed to a wet coaling reactor, and held there 1.5 hours at a temperature of 190° C. and a steam pressure 13 bar. The steam during the 1.5 hour long treatment was added in the form of fresh steam.

After the wet coaling stage the peat was transported in countercurrent flow with recently introduced peat, and then subjected to pressing in a plate filter press to a solids content of 49%. The press cakes so obtained were then burned in a boiler.

TABLE I

| Energy balance | Process of the invention | Wet coaling process |
|---|---|---|
| Theoretical energy content of raw peat for 10 kgs of dry peat/sec, MW | 200 | 200 |
| Net heat need, in preheater MW | — | 20 |
| Net heat need, in wet coaling MW | — | 29 |
| Net heat need, in steam dryer MW | 17 | — |
| Heat value of the peat at introduction in the boiler MJ/kgs of dry peat | 19.5 | 15.5 |
| Boiler degree of efficiency, % | 86 | 80 |
| Boiler energy, MW | 168 | 124 |
| Boiler energy, in the form of electricity MW | 54 | 33 |
| Boiler energy, in the form of distant heat MW | 97 | 42 |

As is evident from the above Table, the process of the invention as compared to the so-called wet coaling process gives (168−124) 100/124, that is, 35%, more total energy, and the increase in the form of recovered electric energy is (54−33) 100/33, that is, 63%.

EXAMPLE 2

Figure 3:
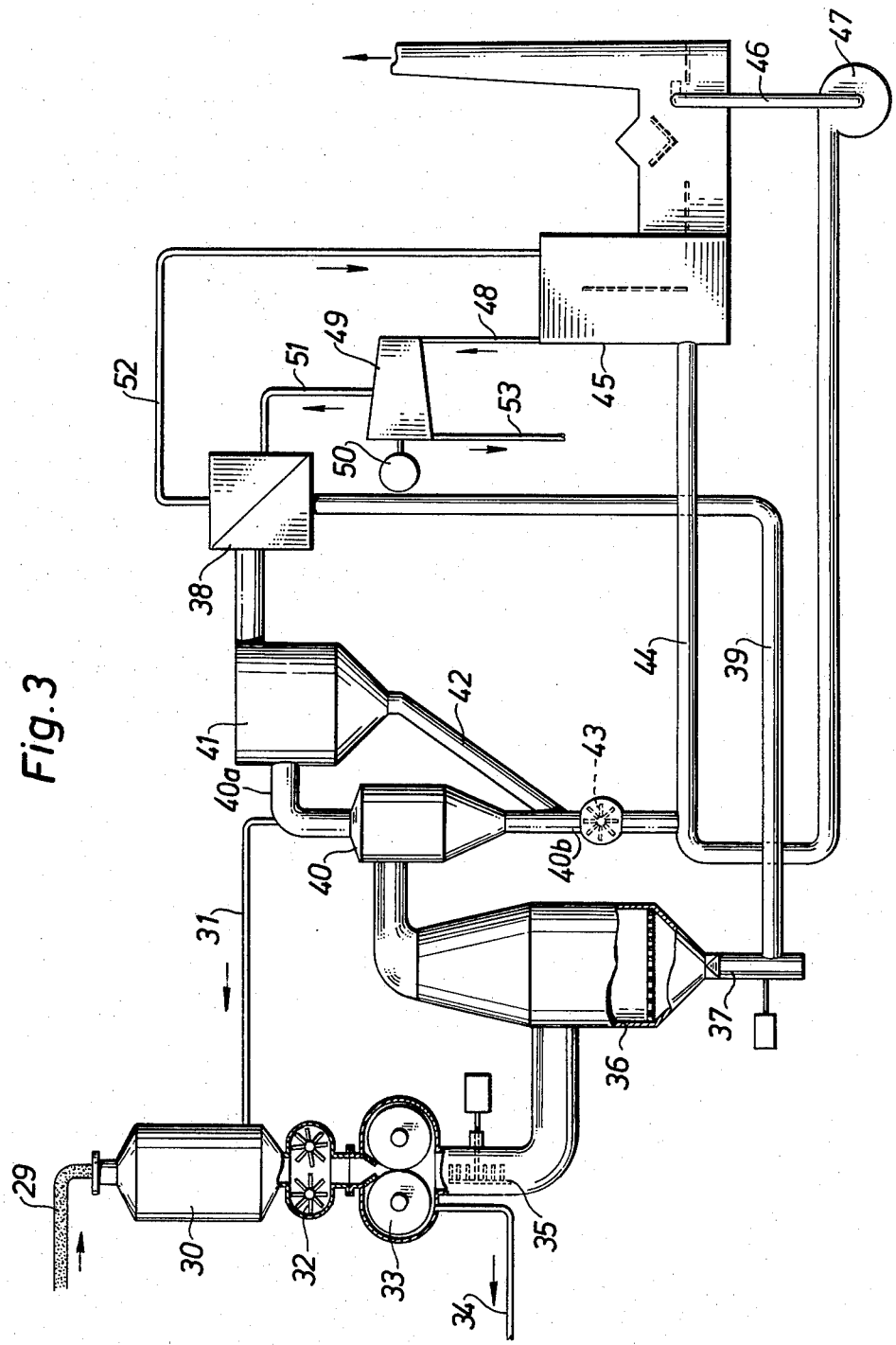
FIG. 3 shows a plant, in which the process of the invention is used in the drying of peat having a solids content of 25% and then combustion.

FIG. 3 shows another system in flow sheet form of a plant for drying and combustion of peat in accordance with the invention.

In this case, the peat is drained and treated while in the peat moss, to a solids content of 25%. The costs for the transport of the peat from the peat moss to the plant in the Figure are correspondingly decreased.

Peat is thus fed via line 29 at a solids content of 25% to a steam-treating vessel 30. In this vessel the peat is treated at a temperature of 95° C. and at substantially atmospheric pressure (1.15 bar) with steam added via the conduit 31. From the vessel 30 the peat is transported via the rotary vane feeder 32 to a roller dewatering press 33, in which the peat is dewatered to 37% solids content. The water that is pressed out is removed through the conduit 34.

The peat web from the roller press is disintegrated into small particles by means of a disintegrator 35 and fed to a dryer 36 through which superheated steam (150° C.) is transported by means of a fan 37, and serves as a carrier for a fluidized bed of peat particles. The superheated steam used in the dryer 36 is led from the superheater 38 via the line 39. In the fluidized bed in the dryer 36, the peat particles are dried. When they are dry enough, and thereby also light enough, they are drawn off with the steam out of the fluidized bed to a cyclone 40.

In the cyclone 40 there is a coarse separation, so that steam is withdrawn from the upper part of the dryer 36, and peat is withdrawn from the lower part. The steam and any entrained peat particles are transferred via line 40a to a multicyclone array 41, in which a final separation of peat and steam is carried out. This part of the dried peat is carried through the line 42 to the line 40b from the bottom of the cyclone 40, where it is mixed with the rest of the peat. The peat is discharged via the rotary vane feeder 43 to a conduit 44, which is connected with the combustion boiler 45. When the peat is sluiced out of the cyclone 40 it has a solids content of 75%.

Flue gases are removed from the boiler 45 and carried via line 46 to a fan 47, which propels the flue gases in line 44 to the feed from the boiler 45, thus drawing peat into the boiler 45, where combustion takes place. The flue gases serve as a carrier for the peat, and also further dry the peat, so that during this transport the solids content of the peat is increased from 75% to 92%. In the boiler superheated steam at high pressure (11.5 MPa) is generated, and carried through the line 48 to one or more turbines 49 connected to a generator 50 for the production of electric power. From the turbine 49 a part of the steam is removed at a pressure 1 MPa, and transported through the line 51 to the superheater 38 for superheating steam used in dryer 36 as the drying medium steam. The drying medium steam has a pressure of 0.115 MPa (1.15 bar), and is recirculated by the fan 37 through the dryer 36, the cyclone 40, the multicyclone array 41, the superheater 38 and the conduit 39. Part of the steam from the cyclone 40 is withdrawn and sent via line 31 to the incoming peat in the vessel 30, as has been previously described. The steam removed from the turbine 49 is condensed to water in the superheater 38 and the water condensate is recirculated to the boiler 45 through the conduit 52. Excess steam from the turbine 49 is carried via the line 53 for other uses.

This application of the process of the invention gives the same high energy recovery from the peat described in Example 1, that is, an increase in the energy recovery of 35%, as compared to the wet coaling process.

EXAMPLE 3

Figure 4:
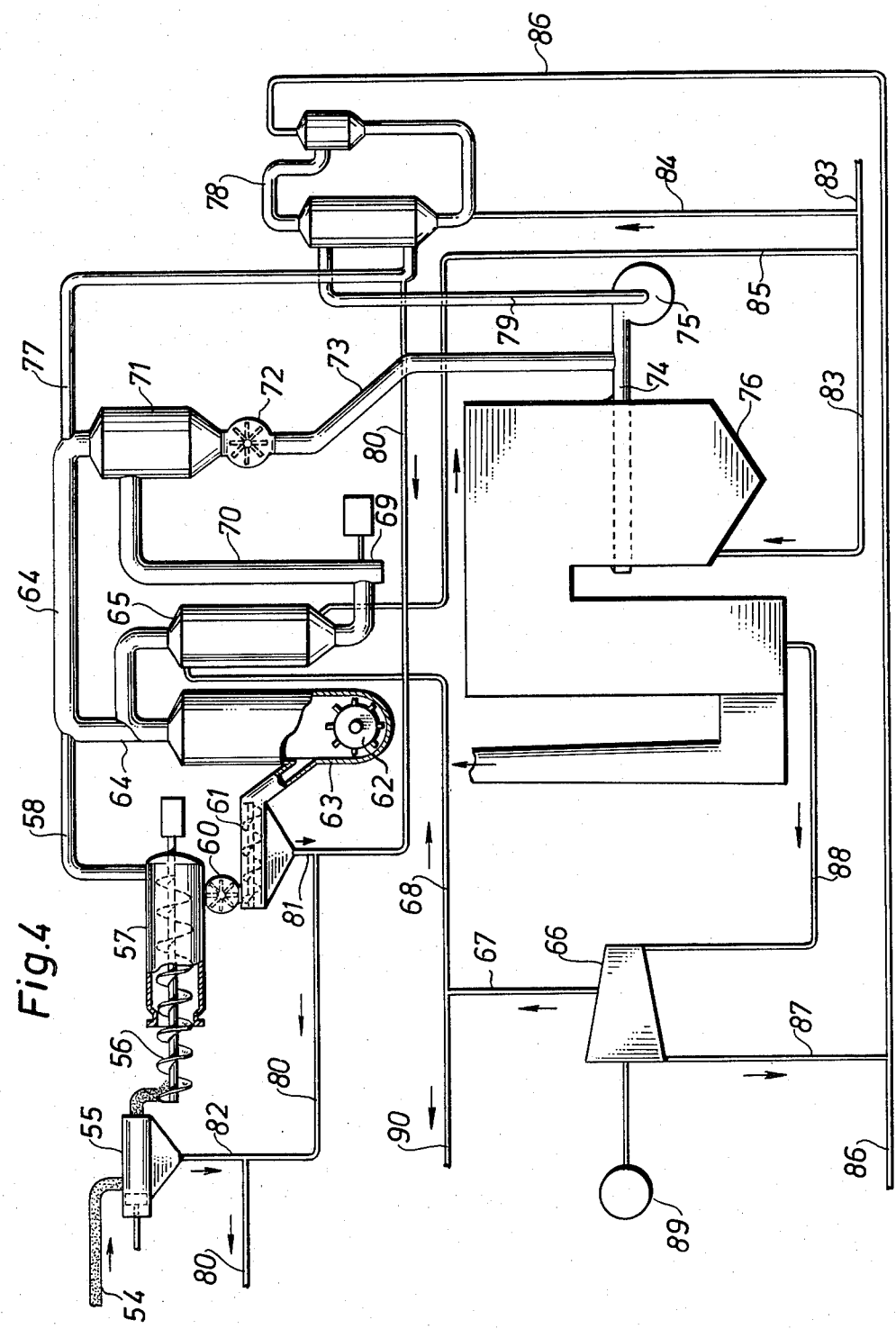
FIG. 4 shows a plant in a cellulose pulp mill in which the process of the invention is applied to bark.

In the system shown in the flow sheet of FIG. 4, the process of the invention is applied to bark in a cellulose pulp mill.

Spruce bark (in which the coarsest bark pieces have been crushed in a mill, not shown in the Figure) is transported via line 54 to a hydraulic press 55. The bark has a solids content of 30% before dewatering in the press, and is dewatered to a solids content of 36%. Then the bark is carried via feed screw 56 to a pressure vessel 57. Steam at a pressure of 0.4 MPa (4 bar) is added via the line 58 onto the bark in the pressure vessel, so that the bark is heated to 140° C. while the steam is condensed. The residence time for the bark in the pressure vessel 57 is three minutes.

The bark is discharged by means of a rotary vane feeder 60 to a screw feeder 61. In this screw feeder the bark is dewatered to a solids content of 47.7% and fed into a recirculating superheated steam system 64. The bark pieces fall from the screw feeder 61 down to a mill 62 on the bottom of the dryer 63, where they are ground to such fine particles that the carrier steam added through the line 64 can entrain them and carry them away. The carrier steam and the finely divided bark thereafter pass through superheater 65, in which excess steam from the turbine 66 transported via lines 67 and 68 condenses at a pressure of 1.6 MPa (16 bar). Then the carrier steam and the bark pass via conduit 70, and propelled by fan 69, to a cyclone 71.

In this cyclone the dried bark is separated from the steam. The bark is discharged by means of a rotary vane feeder 72 out of the cyclone 71, and carried via line 73 to a line 74. At the end of the line 74 is a fan 75, by means of which the finely-divided bark (particle size less than 0.4 mm) together with a part of the combustion gas and any other gases are blown tangentially into the furnace 76.

At the entrance to the furnace, the bark powder has a solids content of 90%. The steam separated in the cyclone 71 is recycled via the line 64 to the dryer 63, and introduced into the same close to the disintegration apparatus, that is, the mill 62.

From the recirculation conduit 64 part of the steam is removed through the line 77 to a steam reformer 78, and part through the line 58 to the pressure vessel 57, as previously described. In the steam reformer 78 steam is fed into the bottom of the same, on one side of the heat exchanger in the steam reformer. Impurities present in the steam (such as inert gases, turpentine, acids, etc.) are purged from the top. These gases are led through the line 79 to the fan 75 which carries them further into the boiler for combustion.

The condensate from the steam is removed from the steam reformer 78 via line 80 to the plant for evaporation of digestion liquor of the mill, and the evaporation residue is then burned in the soda boiler. To the line 80 press water from the screw feeder 61 is fed through the line 81, and from the hydraulic press 55 through the line 82.

On the other side of the heat exchanger in the steam reformer 78, feed water obtained from the mill and added through the lines 83 and 84 is circulating. The feed water evaporates at a pressure of 0.4 MPa (4 bar), and the steam is carried through the line 86 to the mill for use there.

The steam condensed in the superheater 65 is carried through the line 85 to line 83, where it is mixed with the feed water that is introduced into the boiler 76. During combustion of the dried bark in the boiler 76, superheated steam at high pressure is generated, which steam is carried through the line 88 to one or more turbines 66 connected to a generator 89 for production of electric power.

From the turbines steam is transported through the line 67 at a pressure of 1.6 MPa. This steam is divided into two streams. One part of the steam is carried through the line 68 to the superheater 65, for indirect transfer of heat to the carrier steam in the drying system, and the other part of the steam is withdrawn via line 90 for use elsewhere in the plant. The steam remaining in the turbine 66, that is, after discharge and reforming to electric energy, is carried at a pressure of 0.4 MPa through the line 87 to the line 86, which is in connection with the plant.

In order to evaluate the importance of the pretreatment of the bark in the pressure vessel 57, two tests were made in addition to the one described above. In the test, the steam treatment in the pressure vessel 57 was excluded. In the other test, the bark was treated in the pressure vessel 57 with steam at a temperature of 105° C., instead of the previously stated steam temperature of 140° C.

The solids content of the bark after passing the screw feeder 61 was measured, and the following results were obtained:

TABLE II

| | No addition of steam in the pressure vessel 57 | Addition of 105° C. steam in the pressure vessel 57 | Addition of steam of 140° C. in the pressure vessel 57 |
|---|---|---|---|
| Solids content in % after the press 55 | 36.3 | 35.8 | 36.0 |
| Solids content in % after steam treatment | — | 32.5 | 31.4 |
| Solids content in % after the screw feeder 61 | 38.5 | 43.0 | 47.7 |

As is evident from Table II the steam pretreatment of the bark in accordance with the present invention gives a solids content of the bark after the second pressing that is substantially higher than if the addition of steam is left out. Even if the value of the steam added is deducted from the process of the invention in a calculation of the energy balance, the pretreatment stage gives a better result.

If the process according to the invention relating to drying and burning of bark described above is compared with the conventional handling of bark, that is, by mechanically dewatering of the bark by means of pressing to a solids content of 40%, followed by combustion in a boiler provided with a sloping grate, one finds that the price of the steam produced according to the invention is 35% lower than the price of steam in the conventional handling of bark. This also is true in spite of the fact that the equipment shown in FIG. 4 combined with the steam boiler leads to a higher investment cost, and also to some increase in the costs of operation, as compared to conventional handling. The lower cost of production per ton of steam is dependent on the fact that considerably more steam is obtained from the same amount of bark, as compared with previously known techniques. Furthermore, the process of the invention enables one to make the steam boiler itself more simply, and thereby more cheaply, and also more reliably, than for instance a steam boiler with sloping grate. By an improved combustion of the bark the amount of dust has been descreased from about 180 mg/normal m$^3$ (Nm$^3$) of flue gas in a steam boiler with sloping grate to about 40 mg/normal m$^3$ (Nm$^3$) of flue gas in the process according to the invention. A further advantage with the system in accordance with FIG. 4 is, that the discharge of oxygen-consuming substances will be low, because of the evaporation of condensate from the steam reformer 78, the press water from the hydraulic press 55, and the press water from the screw feeder 61.

EXAMPLE 4

Figure 5:
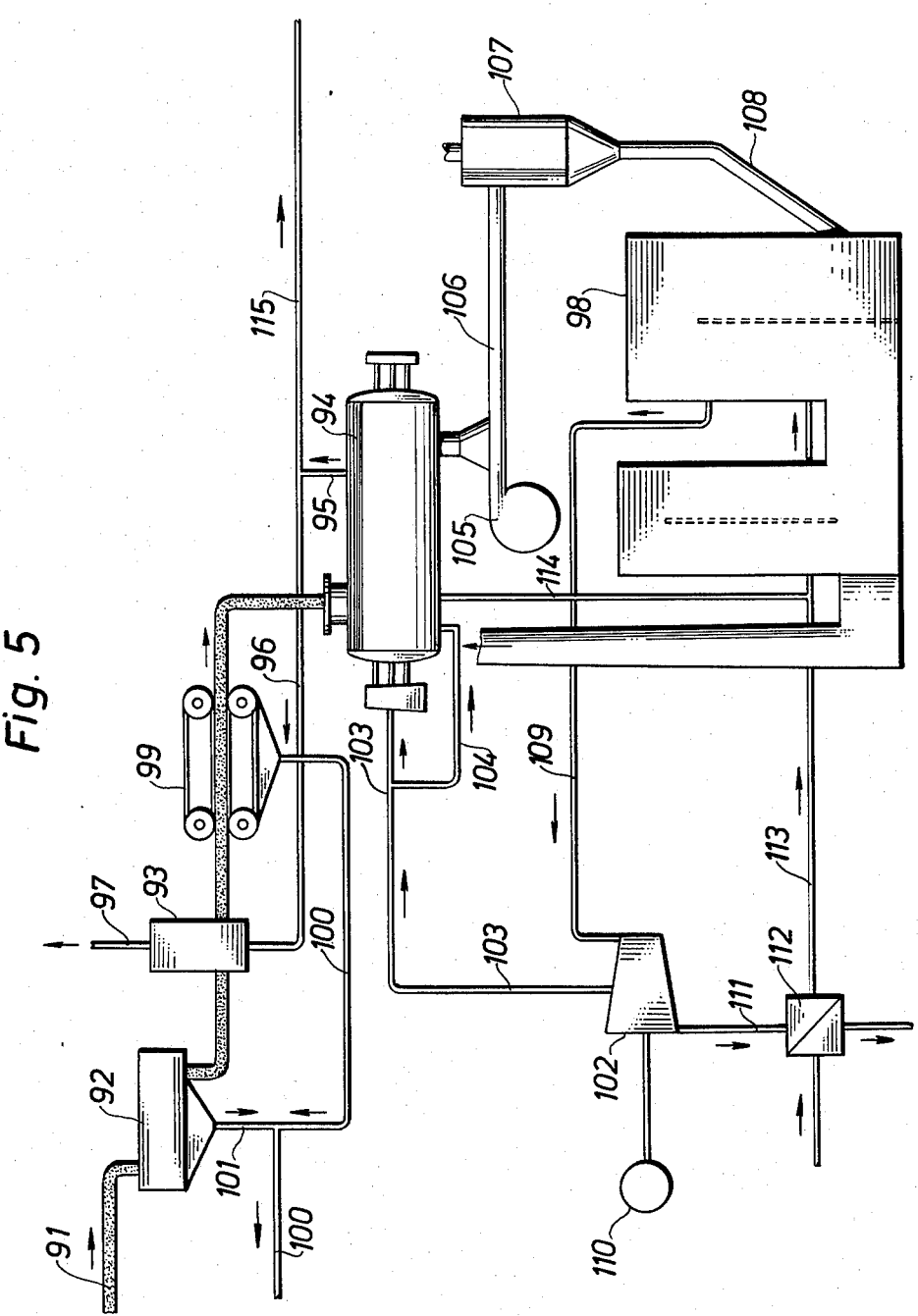
FIG. 5 shows a plant in which the process of the invention is used for the drying and combustion of municipal sewage sludge.

In the system shown in the flow sheet of FIG. 5, the process according to the invention is used in a plant for drying and combustion of raw municipal sewage sludge.

The sludge comes via line 91 from an activated sludge plant, has a solids content of 4%, and is dewatered in a conventional press 92 to a solids content of 10%. The press 92 can be replaced with for instance a decanting centrifuge. The dewatered sludge is transferred to a container 93, in which the sludge is heated to 80° C. by means of direct condensation of steam, which is obtained from the dryer 94. From the dryer the steam is transported through the lines 95 and 96. During condensation of the steam in the sludge, ill-smelling gases are liberated, which are collected at the top of the container 93, and led via line 97 to the steam boiler 98, in which the gases are combusted together with dried sludge and oil. The sludge is then transferred to a belt screen press 99, and dewatered to a solids content of 37%. The water that is pressed out of the band screen press 99 together with water pressed out of the press 92 is recirculated via line 100 back to the activated sludge plant.

After the final mechanical dewatering, the sludge is transferred to the dryer 94. The dryer comprises a pressure vessel with three axially arranged transport screws, which are constructed so that they clean each other during rotation, and serve as pressure-tight sluices in the feeding and discharge of the sludge to and from the dryer 94.

Heat is supplied indirectly to the dryer 94 by withdrawing steam of a pressure of 0.9 MPa (9 bar) from the turbine 102, and carrying it through the line 103 to the hollow transport screws, in which the steam is condensed. Part of the steam in the conduit 103 is carried by means of the conduit 104 to the mantel of the pressure vessel, where the steam is condensed. The pressure of the steam in the drying apparatus 94 where the sludge is kept is 0.2 MPa (2 bar).

In this type of dryer, which is called a contact dryer, it is essential that good heat conduction between the screws and the sludge is obtained.

The sludge has a solids content of 90% when discharged from the dryer 94. The sludge is discharged in finely divided form, as a powder, and is blown by fan 105 through the line 106 to a cyclone 107. In the cyclone the powdered sludge is separated and transported further through the line 108 to the furnace of the steam boiler 98. The sludge is combusted together with oil in the steam boiler 98, whereupon superheated steam at high pressure is generated, and transported through the line 109 to one or more turbines 102, connected to a generator 110 for production of electric power.

As has been earlier stated, steam is withdrawn from the turbine 102 and led as indirect heating steam to the dryer 94 via lines 103 and 104. The steam remaining in the turbine after discharge and reforming to electric energy passes via the line 111 to the heat condenser 112, where it is condensed. The condensate is transferred back to the steam boiler 98 via line 113 as feed water.

The condensate from the dryer 94 is carried via the line 114 to the line 113, for further transfer as feed water to the steam boiler 98. Part of the steam recovered in the dryer 94, as has been earlier described, is transferred by means of the conduits 95 and 96 to the pretreatment vessel 93.

The rest of the steam recovered in the dryer 94 is carried through the line 115 to the activated sludge plant (not shown in the Figure). In this plant, which contains basins, among other things, the waste water comes into contact with activated sludge and air. In order to obtain a high growth velocity of sludge in the basins, the air is heated with the recovered steam, and thereby one also obtains an elevation of the temperature of the water in the basins.

As is evident from the above description, oil is added to the boiler and burned together with the dried sludge. Since the solids content of the sludge is very low in the beginning, and due to the physical structure of the sludge, it is not possible to dry the sludge and then during combustion obtain enough energy for the whole sludge treatment operation; one must always add energy, and this is usually in the form of oil. The handling of sludge thus always adds expense. Depending on the type of sludge and the solids content of the sludge, between 0.5 and 1.0 kg of oil/kg of dry sludge are required for disposing of the sludge in conventional drying and combustion processes. The cost for conventional handling of sludge, for instance, comprising dewatering the sludge in a decantering centrifuge and drying and combustion of the same in a multistage oven and depositing the ash, amounts to about $125.00/ton of dry sludge. If the sludge is treated in the way shown in FIG. 5, that is, in accordance with the process of the invention, this cost can be decreased 25%. Furthermore, the process results in the prevention of odor discharges, and the problem with uncombusted dust is decreased.

Having regard to the foregoing disclosure, the following is claimed as inventive and patentable embodiments thereof:

1. A process for the efficient conversion of water-containing organic material as a fuel into heat and electric energy, including drying the material to convert it into a fuel and then combusting the fuel to recover electric energy at low cost; which comprises heating the material in a steam vessel in which the material is enveloped in steam at superatmospheric pressure that is heated by heat exchange with steam derived from combustion of the fuel at a higher pressure and higher temperature than the steam in the vessel; recycling water driven from the material as steam and forming excess steam in the vessel at least in part to the material in the vessel and condensing it directly thereon; mechanically separating water from the material, and then drying the material to convert the material into a fuel; combusting the dry fuel in particulate form, thereby generating steam at high pressure; utilizing the high pressure steam to operate a turbine; which in turn operates a generator; converting the energy content of the steam into electric energy; and recycling at least part of the steam from the turbine for heat exchange with the steam in the steam vessel.

2. A process according to claim 1 in which the solids content of the organic material during heating with steam is increased to at least 10% by weight.

3. A process according to claim 1 in which the organic material is reduced to finely divided form after the separation of water and before combusting.

4. A process according to claim 1 in which the organic material is dried sufficiently to form a fuel having a solids content of at least 90% by weight.

5. A process according to claim 1 in which the dry fuel before the combustion is reduced to a particle size of less than 3 mm in diameter.

6. A process according to claim 1 in which the organic material in the steam vessel is heated by convection, and is selected from the group consisting of bark and peat.

7. A process according to claim 1 in which the organic material in the steam vessel is sludge, and is heated by conduction.

8. A process according to claim 1 in which the organic material is selected from the group consisting of bark, peat and sludge.

9. A process according to claim 1 in which the water is separated by application of mechanical compression to the material.

10. A process according to claim 1 in which the water is separated by application of centrifugal force.

11. A process according to claim 1 which comprises mechanically separating water from the material before heating the material in a steam vessel.

12. A process according to claim 11 in which the water is separated by application of mechanical compression to the material.

13. A process according to claim 11 in which the water is separated by application of centrifugal force.

* * * * *

UNITED STATES PATENT AND TRADEMARK OFFICE
CERTIFICATE OF CORRECTION

PATENT NO. : 4,290,269
DATED : September 22, 1981
INVENTOR(S) : Bengt O.A. Hedstrom et al It is certified that error appears in the above-identified patent and that said Letters Patent are hereby corrected as shown below:

| | | |
|---|---|---|
| Column 1, line 28 | : | after "today" insert -- to -- |
| Column 2, line 24 | : | "set" should be --wet-- |
| Column 2, line 60 | : | "combination" should be --combustion-- |
| Column 3, line 50 | : | "3.100/6.7=45% and 4.100/6.7=60%" should be --3·100/6.7=45% and 4·100/6.7=60%-- |
| Column 6, line 58 | : | "Mpa" should be --MPa-- |
| Column 8, line 4 | : | "in" should be --In-- |

Signed and Sealed this

Twenty-second Day of July 1986

[SEAL]

Attest:

DONALD J. QUIGG

Attesting Officer

Commissioner of Patents and Trademarks